United States Patent Office 3,704,268
Patented Nov. 28, 1972

3,704,268
CURABLE, SOLID POLYMERS BASED ON CYCLO-ALIPHATIC POLYEPOXIDES AND A METHOD FOR THE PREPARATION THEREOF
John Wynstra, Somerville, and Thomas B. Gibb, Jr., Murray Hill, N.J., assignors to Union Carbide Corporation, New York, N.Y.
No Drawing. Filed Apr. 13, 1970, Ser. No. 28,030
Int. Cl. C08g 30/00
U.S. Cl. 260—2 EP
34 Claims

ABSTRACT OF THE DISCLOSURE

This invention relates to curable, solid polymers, based on cycloaliphatic polyepoxides, and to a method for the preparation thereof by reacting a liquid cycloaliphatic polyepoxide with a polyfunctional, acidic co-reactant having a pKa value of less than about 8, such as polycarboxylic acid or a polyhydric phenol, in a reaction medium containing a tertiary amine. The curable, solid polymers of this invention can be used in molding, coating and laminating applications and cured to infusible products characterized by excellent properties such as electrical properties.

---

This invention relates to curable, solid polymers, based on cycloaliphatic polyepoxides, and to a method for the preparation thereof by reacting a liquid cycloaliphatic polyepoxide with a polyfunctional, acidic co-reactant having a pKa value of less than about 8, such as a polycarboxylic acid or a polyhydric phenol, in a reaction medium containing a tertiary amine. The curable, solid polymers of this invention can be used in molding, coating and laminating applications and cured to infusible products which are characterized by excellent properties such as excellent electrical properties.

The production of curable, solid polyepoxide polymers has been carried out, as a general rule, by reacting a bisphenol such as 2,2-bis(p-hydroxyphenyl)propane with epichlorohydrin in an alkaline reaction medium. Curable, solid polymers produced by reacting a bisphenol with epichlorohydrin, as described, have a hydrolyzable chlorine content which renders such polymers undesirable for use in many applications, as for example, in electrical applications. Furthermore, the hydrolyzable chlorine of these polymers tends to interfere with the curing mechanism between the epoxide groups of the polymers and the reactive groups of the curing agents, which are generally used in order to cure these polymers to infusible products. As a result, cured products are obtained which are generally characterized by inferior properties.

The present invention provides curable, solid polymers, based on cycloaliphatic polyepoxides, which are free of hydrolyzable chlorine and when cured are characterized by excellent properties, as previously described. In addition, this invention provides for the condensation of a cycloaliphatic polyepoxide with a suitable co-reactant, as will be defined, to produce a curable, solid polymer having substantially the calculated epoxide equivalent weight value.

Suitable liquid cycloaliphatic polyepoxides for purposes of this invention are those having an average of more than one vicinal epoxy group per molecule. The epoxy groups can be terminal epoxy groups or internal epoxy groups as exemplified by the cycloaliphatic polyepoxides which are subsequently described. Particularly desirable cycloaliphatic polyepoxides are the bis(epoxycyclohexanes), that is, epoxides having at least one cyclohexane ring to which is attached at least one vacinal epoxy group.

Illustrative of suitable cycloaliphatic epoxides are the following:

FORMULA I

Diepoxides of cycloaliphatic esters of dicarboxylic acids having the formula:

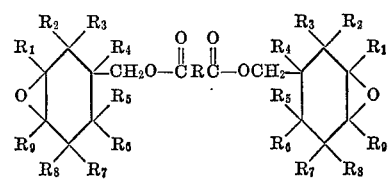

wherein $R_1$ through $R_9$, which can be the same or different, are hydrogen or alkyl radicals generally containing 1 to 9 carbon atoms inclusive and preferably containing 1 to 3 carbon atoms inclusive as for example methyl, ethyl, n-propyl, n-butyl, n-hexyl, 2-ethylhexyl, n-octyl, n-nonyl and the like; R is a valence bond or a divalent hydrocarbon radical generally containing 1 to 9 carbon atoms inclusive and preferably containing 4 to 6 carbon atoms inclusive, as for example, alkylene radicals, such as trimethylene, tetramethylene, pentamethylene, hexamethylene, 2-ethylhexamethylene. octamethylene, nonamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_9$ are hydrogen and R is alkylene containing 4 to 6 carbon atoms.

Among specific diepoxides of cycloaliphatic esters of dicarboxylic acids are the following:

bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate, and the like. Other suitable compounds are described in U.S. Pat. 2,750,395 to B. Phillips et al, issued June 12, 1956.

FORMULA II

A 3,4-epoxycyclohexylmethyl 3,4-epoxycyclohexane carboxylate having the formula:

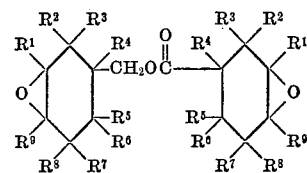

wherein $R^1$ through $R^9$, which can be the same or different, are as defined for $R_1$ in Formula I. Particularly desirable compounds are those wherein $R^1$ through $R^9$ are hydrogen.

Among specific compounds falling within the scope of Formula II are the following:

3,4-epoxycyclohexylmethyl 3,4-epoxycyclohexane-carboxylate,
3,4-epoxy-1-methylcyclohexylmethyl 3,4-epoxy-1-methylcyclohexanecarboxylate,
6-methyl-3,4-epoxycyclohexylmethyl 6-methyl-3,4-epoxycyclohexanecarboxylate,
3,4-epoxy-3-methylcyclohexylmethyl 3,4-epoxy-3-methylcyclohexanecarboxylate,
3,4-epoxy-5-methylcyclohexylmethyl 3,4-epoxy-5-methylcyclohexanecarboxylate.

Other suitable compounds are described in U.S. Pat. 2,890,194 to B. Phillips et al., issued June 9, 1959.

FORMULA III

Diepoxides having the formula:

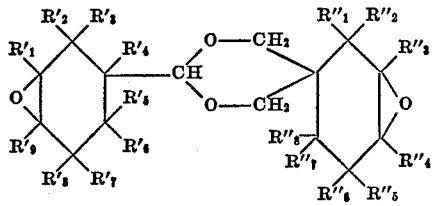

wherein the R single and double primes, which can be the same or different, are monovalent substituents such as hydrogen, halogen, i.e., chlorine, bromine, iodine or fluorine, or monovalent hydrocarbon radicals, or radicals as further defined in U.S. Pat. 3,318,822 to Hans Batzer et al., issued May 9, 1967. Particularly desirable compounds are those wherein all the R's are hydrogen.

Other suitable cycloaliphatic epoxides are: and the like.

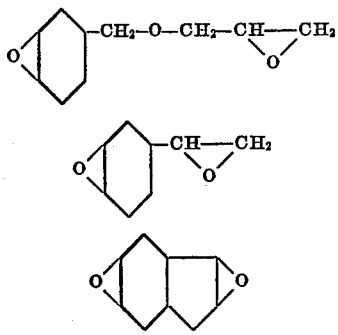

and the like.

Co-reactants which are condensed with the cycloaliphatic polyepoxides to produce the curable, solid polymers of this invention are polyfunctional "acidic" compounds which have a pKa value of less than about 8 and preferably less than about 5.

Among such compounds are the polycarboxylic acids having a pKa value of less than about 8 (pKa is defined in the Handbook of Chemistry and Physics—50th ed. at pp. D118–119).

Illustrative of such acids are those having thhe formula:

HOOC(A)COOH wherein A is a valence bond or a divalent hydrocarbon radical, having a maximum of 25 carbon atoms and preferably having a maximum of 10 carbon atoms.

Exemplary of suitable acids are succinic acid, glutaric acid, adipic acid, pimelic acid, suberic acid, fumaric acid, glutaconic acid, citraconic acid, phthalic acid, isophalic acid, terephthalic acid, halogen substituted phthalic acids, alkyl substituted phthalic acids wherein the alkyl substituent can be exemplified by methyl, ethyl, n-propyl and the like, naphthalene dicarboxylic acids, cyclobutane dicarboxylic acids, cyclopentane dicarboxylic acids, cyclohexane dicarboxylic acids, bicycloheptane dicarboxylic acids and the like, aliphatic tricarboxylic acids such as tricarballylic acid, citric acid and the like, aromatic tricarboxylic acids such as hemimellitic acid, trimellitic acid and the like; cycloaliphatic tricarboxylic acids such as Δ⁴-3-carboxy-6-methyltetrahydrophthalic acid and the like.

Other suitable polyfunctional, acidic co-reactants are the dihydroxydiphenyl sulfones and the halogenated dihydroxydiphenyl alkanes having the formulas noted below:

Dihydroxydiphenyl sulfone

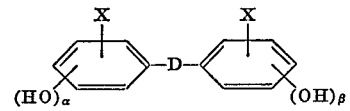

wherein each Y and each $Y^1$ which can be the same or different is alkyl of 1 to 4 carbon atoms inclusive such as methyl, ethyl, propyl or butyl or halogen, i.e., chlorine, bromine, iodine or fluorine, $\gamma$ and $\delta$ are integers having a value of 0 or 1, $\alpha$ and $\beta$ are integers having a value of 0 to 2 inclusive provided that the sum of $\alpha$ and $\beta$ is at least 2.

Dihydroxydiphenyl alkane

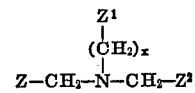

wherein $\alpha$ and $\beta$ are as defined in the sulfone formula above, each X is a halogen as defined in the sulfone formula above and D is a divalent hydrocarbon radical having a maximum of 4 carbon atoms, such as methylene, ethylidene, propylidene and the like.

Specific compounds include among others bis(p-hydroxyphenyl)sulfone, 4,4' - isopropylidene bis(2,6-dibromophenol) and the like.

Suitable tertiary amines for purposes of this invention can be exemplified by amines having the formula:

$$Z-CH_2-N(CH_2)_xZ^1-CH_2-Z^2$$

wherein x is an integer having a value of 0 or 1 and Z, $Z^1$ and $Z^2$ which can be the same or different are hydrogen or monovalent hydrocarbon radicals, particularly monovalent hydrocarbon radicals which are free of olefinic and acetylenic unsaturation and have a maximum of 25 carbon atoms, preferably a maximum of 12 carbon atoms.

Illustrative of suitable monovalent hydrocarbon radicals for Z, $Z^1$ and $Z^2$ are alkyl radicals such as methyl, ethyl, n-propyl, isopropyl, n-butyl, n-amyl, n-hexyl, 2-ethylhexyl, n-heptyl, n-octyl, n-nonyl, n-dodecyl, and the like; aryl radicals such as phenyl and the like; aralkyl radicals such as 2-phenyl-ethyl, 3-phenyl-n-propyl, 4-phenyl-n-butyl, 5-phenyl-n-amyl, 2-phenyl-n-hexyl, 3-phenyl-n-heptyl, benzyl and the like; alkaryl radicals such as o-methylphenyl, p-ethylphenyl, p-amylphenyl, o-n-butylphenyl and the like.

Specific compounds include, among other, trimethylamine,
triethylamine,
tri-n-propylamine,
tri-n-butylamine,
tri-n-dodecylamine,
tri-n-docosylamine,
tri(2-phenylethyl)amine,
tribenzylamine,
dimethyl-n-propylamine,
diethyl-n-propylamine,
methylethyl-n-propylamine,
N,N-dimethylaniline,
benzyldimethylamine and the like.

As a general rule, the temperature at which the polymerization or condensation reaction is conducted can vary over a wide range from about 0° C. to about 250° C. A particularly preferred range is from about 70° C. to about 130° C.

The polymerization reaction can be conducted under atmospheric, subatmospheric or superatmospheric pressure, and if desired, under an inert, gaseous atmosphere such as an argon gas atmosphere.

In addition, organic solvents such as ketones, exemplary of which is methyl isobutyl ketone, halogenated hydrocarbons such as chlorobenzene and aromatic hydrocarbons such as toluene can be used to fluidize the reaction mixture in order to provide for better contact of the reactants.

Completion of the reaction is evidenced by disappearance of the "acidic" groups. For practical purposes, the reaction is deemed to be complete when the acid value of the reacted mixture is less than about 0.1 meq./gram.

Recovery of the polymer from the reacted mixture can be conveniently accomplished by vacuum stripping the volatiles from the solid polymer.

In carrying out the polymerization reaction, the amount of co-reactant used is about 0.05 to about 0.9 equivalent (based on the "acidic" groups) per equivalent of the cycloaliphatic polyepoxide (based on the epoxy groups). It is preferred to use about 0.20 to about 0.80 equivalent of co-reactant per equivalent of the cycloaliphatic polyepoxide.

If desired the acidic compound can be generated "in situ" in the reaction mixture by utilizing an acid anhydride in conjunction with water. The amount of acid anhydride and water used is sufficient to provide acid in an amount of about 0.05 to about 0.9 equivalent per equivalent of the cycloaliphatic polyepoxide, as previously defined.

The tertiary amine is used in amounts of about 0.25 to about 2.5 moles and preferably about 0.5 mole to about 1 mole per equivalent of the acidic compound.

In formulating compositions to be used in molding, coating and laminating applications, it is customary to add to the polymers of this invention which contain vicinal epoxy groups, an epoxy curing agent such as an acid, as previously defined, or an anhydride thereof. As a general rule, the acid or anhydride is used in amounts of about 25 percent of stoichiometric to about 95 percent of stoichiometric. For purposes of stoichiometric calculations, one carboxyl group or one anhydride group is deemed to react with one epoxy group.

Also, in addition to the curing agents, fillers, pigments and the like, in amounts well known in the art, can be admixed with the solid polymers of this invention, to provide compositions of desired formulations.

Once formulated and used in the desired manner, the compositions are heated at elevated temperatures generally on the order of about 125° C. to about 200° C. for a period of time ranging from about 5 to about 30 minutes in order to cure the compositions to infusible products. The actual heating cycle will vary and depend in part upon the exact formulation of the compositions.

The disclosure of all references noted in the specification is incorporated herein by reference.

The following examples further illustrate the present invention and are not intended to limit the scope thereof in any manner.

EXAMPLE 1

This example illustrates the preparation of a solid, curable polymer of isophthalic acid and 3,4-epoxycyclohexylmethyl 3,4-epoxycyclohexanecarboxylate.

The materials noted below were weighed directly into a one liter flask which was equipped with a mechanical agitator, reflux condenser and gas inlet tube.

| | Grams | Moles | Equivalents |
|---|---|---|---|
| Isophthalic acid | 123.3 | 0.743 | 1.486 |
| 3,4-Epoxycyclohexylmethyl 3,4-epoxycyclohexane carboxylate | 326.7 | 1.19 | 2.385 |
| Methyl isobutyl ketone | 149.6 | | |

To this mixture there was then added 150.3 grams, 1.486 equivalents (1.486 moles), of triethylamine while the reaction flask was maintained under an argon gas atmosphere. The mixture was then heated to reflux (95° C.) and maintained at a temperature of about 90° C. for one hour. At the end of this period of time, the acid value was 23 percent of the calculated initial acid value. Acid values were determined by dissolving samples in a 5 to 1, by volume, pyridine-water medium and titrating with 0.05 N. NaOH using phenolphthalein as the indicator.

Heating was continued for another seven hours, with the reaction mixture at a temperature of about 90° C. At the end of this seven-hour period, the acid value of the reacted mixture was 0.75 percent of the calculated initial acid value or 0.01 meq./gram. The reacted mixture was vacuum stripped to a temperature of 135° C. under a pressure of 20 mm. Hg. The solid, curable epoxy polymer recovered had the following properties:

Ball and ring softening point=184° F.
Epoxy value:
   Calculated=2.00 meq./gram
   Found=1.954 meq./gram
Epoxide equivalent weight:
   Calculated=500
   Found=512

EXAMPLE 2

This example illustrates the preparation of a solid, curable polymer of phthalic acid and 3,4-epoxycyclohexylmethyl 3,4-epoxycyclohexane carboxylate wherein the phthalic acid is generated "in situ."

The materials noted below were weighed directly into a one liter flask which was equipped with a mechanical agitator, thermometer, reflux condenser and gas inlet tube.

| | Grams | Moles | Equivalents |
|---|---|---|---|
| Phthalic acid anhydride | 48.85 | 0.33 | 0.660 |
| Water | 5.95 | 0.33 | |
| Diepoxide (described in Example 1) | 145.3 | 0.53 | 1.060 |
| Methyl isobutyl ketone | 66.5 | | |

To this mixture there was then added 66.8 grams, 0.65 equivalent (0.65 mole), of triethylamine and the reaction and recovery of product carried out as described in Example 1. At the completion of the reaction, the acid value of the reacted mixture was 0.004 meq./gram.

The solid, curable epoxy polymer recovered had the following properties:

Ball and ring softening point=220° F.
Epoxy value=2.112 meq./gram
Epoxy equivalent weight:
   Calculated=500
   Found=473

EXAMPLE 3

This example illustrates the preparation of a solid, curable polymer of trimellitic acid, formed in situ from the anhydride, isophthalic acid and the diepoxy carboxylate of Example 1.

The materials noted below were weighed directly into a one liter flask which was equipped with a mechanical agitator, thermometer, reflux condenser and gas inlet tube.

| | Grams | Moles | Equivalents |
|---|---|---|---|
| Distilled water | 1.44 | 0.080 | |
| Trimellitic acid anhydride | 15.36 | 0.080 | 0.239 |
| Isophthalic acid | 36.0 | 0.217 | 0.433 |
| Diepoxide (described in Example 1) | 147.2 | 0.54 | 1.074 |
| Methyl isobutyl ketone | 65.2 | | |

To this mixture was then added 68.1 grams, 0.67 equivalent (0.67 mole), of triethylamine and the reaction and recovery of product carried out as described in Example 1. At the completion of the reaction, the acid value of the reacted mixture was 0.01 meq./gram.

The solid, curable epoxide recovered had the following properties:

Ball and ring softening point=210° F.
Epoxy value=2.01 meq./gram
Epoxide Equivalent Weight
   Calculated=500
   Found=498

EXAMPLE 4

This example illustrates the preparation of a solid, curable polymer of phthalic acid formed in situ from the anhydride and the diepoxy carboxylate described in Example 1.

The materials noted below in the order listed were weighed directly into a one liter flask which was equipped with a mechanical agitator, thermometer, reflux condenser and a gas inlet tube.

|  | Grams | Moles | Equivalents |
|---|---|---|---|
| Distilled water | 4.5 | 0.25 |  |
| Phthalic acid anhydride | 103.7 | 0.70 | 1.36 |
| Diepoxide (described in Example 1) | 296.0 | 1.08 | 2.16 |
| Triethylamine | 70.8 | 0.70 | 0.70 |

The reaction mixture was stirred until the initial exotherm had subsided and the temperature of the reaction mixture was then increased slowly to 110° C. The reaction mixture was then maintained at reflux for 1.2 hours. At this point the acid value was 0.005 meq./gram. Distillation was continued until the pot temperature reached 150° C. The reacted mixture was then placed under a pressure of 50 mm. Hg and heated to a temperature of 160° C. with the result that all volatiles were removed.

The solid, curable polymer recovered had the following properties:

Ball and ring softening point=190° C.
Epoxy value=2.88 meq./gram
Epoxide equivalent weight
  Calculated=340
  Found=347

EXAMPLE 5

This example illustrates the preparation of a solid, curable polymer of the diepoxy carboxylate of Example 1, and isophthalic acid using the amines identified below in a reaction containing methyl isobutyl ketone as the solvent. The acid and diepoxycarboxylate were used in the same equivalent ratios as in Example 1. The amines were used in amounts of 0.5 equivalent (0.5 mole) per carboxyl equivalent. Reaction conditions and recovery of polymers were the same as described in Example 1.

|  | Polymer A | Polymer B |
|---|---|---|
| Amine | Tripropylamine | Dimethylaniline |
| Epoxy equivalent weight: |  |  |
| Calculated | 495 | 495 |
| Found | 514 | 588 |
| Ball and ring softening point, ° F | 210 | 250 |

EXAMPLE 6

This example illustrates the preparation of a solid, curable polymer of 4,4'-dihydroxydiphenyl sulfone which has a pKa of 7 and the diepoxy carboxylate of Example 1.

The materials noted below were weighed directly into a 500 milliliter flask equipped with a mechanical agitator, thermometer, reflux condenser and a gas inlet tube.

|  | Grams | Moles | Equivalents |
|---|---|---|---|
| Diepoxide (described in Example 1) | 139.7 | 0.500 | 1.000 |
| 4,4'-dihydroxydiphenyl sulfone | 76.9 | 0.308 | 0.615 |
| Methyl isobutyl ketone | 31.0 |  |  |

To the mixture was added 62.4 grams, 0.615 equivalent, of triethylamine and the reaction and recovery of the product were carried out as described in Example 1.

The solid, curable epoxy polymer recovered had the following properties:

Ball and ring softening point =261° F.
Epoxide equivalent weight
  Calculated=575
  Found=663

EXAMPLE 7

This example illustrates the preparation of a solid, curable polymer from 4,4'-isopropylidene bis(2,6-dibromophenol) and the diepoxide of Example 1.

The materials noted below were weighed directly into a 250 milliliter flask equipped with a mechanical agitator, thermometer, reflux condenser and gas inlet tube.

|  | Grams | Moles | Equivalents |
|---|---|---|---|
| Diepoxide (described in Example 1) | 41.7 | 0.598 | 0.299 |
| 4,4'-isopropylidene bis(2,6-dibromophenol) pKa value=7 | 43.8 | 0.0806 | 0.161 |
| Methyl isobutyl ketone | 41.0 |  |  |

To the mixture was added 16.1 grams, 0.159 equivalent, of triethylamine and the reaction and the recovery of the product were carried out as described in Example 1.

The solid, curable epoxy polymer recovered had the following properties:

Ball and ring softening point=234° F.
Epoxide equivalent weight
  Calculated=622
  Found=634

EXAMPLE 8

This example illustrates the preparation of a solid, curable polymer of phthalic acid formed in situ from its anhydride and spiro[3,4-epoxycyclohexane-1,5'-(2'-(3,4-epoxycyclohexyl)-m-dioxane)]. (Formula III, wherein all the R's are hydrogen.)

The materials noted below in the order listed were weighed directly into a 500 milliliter flask equipped with a mechanical agitator, thermometer, reflux condenser and a gas inlet tube.

|  | Grams | Moles | Equivalents |
|---|---|---|---|
| Phthalic anhydride | 51.9 | 0.350 | 0.700 |
| Distilled water | 2.25 | 0.125 |  |
| Spiro[3,4-epoxycyclohexane-1,5'-(2'-(3,4-epoxycyclohexyl)-m-dioxane)] | 158.7 | 0.54 | 1.08 |
| Methyl isobutyl ketone | 105.0 | 0.350 | 0.350 |
| Triethylamine | 35.4 | 0.350 | 0.350 |

The reaction and the recovery of the product were carried out as described in Example 4.

The solid, curable epoxy polymer recovered had the following properties:

Ball and ring softening point=253° F.
Epoxide equivalent weight
  Calculated=355
  Found=379

EXAMPLE 9

This example illustrates the preparation of a solid, curable polymer of phthalic acid formed in situ from its anhydride and the diepoxide of Example 8.

The materials noted below in the order listed were weighed directly into a three liter flask equipped with a mechanical agitator, thermometer, reflux condenser and a gas inlet tube.

|  | Grams | Moles | Equivalents |
|---|---|---|---|
| Phthalic anhydride | 213.5 | 1.44 | 2.88 |
| Distilled water | 4.3 | 0.239 |  |
| Diepoxide of Example 8 | 1000 | 3.45 | 6.90 |
| Methyl isobutyl ketone | 672 |  |  |
| Triethylamine | 145.9 | 1.44 | 1.44 |

The reaction and recovery of the product were carried out as in Example 4.

The solid, curable polymer recovered had the following properties:

Ball and ring softening point=200° F.
Epoxide equivalent weight
  Calculated=234
  Found=243

EXAMPLE 9A

This example illustrates the preparation of a solid, curable polymer of isophthalic acid and 4-vinyl cyclohexene dioxide.

The materials noted below were weighed into a 500 milliliter flask which was equipped with a mechanical agitator, thermometer, reflux condenser and a gas inlet tube.

|  | Grams | Moles | Equivalents |
|---|---|---|---|
| Vinyl cyclohexene dioxide | 89.0 | 0.605 | 1.210 |
| Isophthalic acid | 61.9 | 0.372 | 0.744 |
| Methyl isobutyl ketone | 76.0 | | |

To the mixture was added 73.5 grams, 0.744 equivalent, of triethylamine. The mixture was then heated to 60–65° C. for 2.5 hours and 95–100° C. for 1 hour. At the end of this period the reaction mixture was vacuum stripped to a temperature of 120° C. under a pressure of 50 mm. Hg. The solid, curable epoxy polymer recovered had the following properties:

Ball and ring softening point=186° F.
Epoxide equivalent weight
  Found=362

A number of solid, curable epoxy polymers were prepared using the diepoxide of Example 1, trimethylamine in an amount of 0.5 equivalent (0.5 mole) per carboxyl equivalent, the acids listed in Table I and methyl isobutyl ketone. Reaction conditions and recovery of polymers were the same as described in Example 4. Polymers prepared are identified as 10 through 18.

Ball and Ring Softening points of Table I and as noted throughout this specification were determined according to the test procedure of ASTM-28-51T.

Gel time—determined by formulation of a composition comprising 0.5 mole of the diepoxide, 0.9 mole of tetrahydrophthalic anhydride and 2 percent by weight, based on the weight of the diepoxide, of triethylenediamine and then proceeding as follows:

A one gram sample of each composition was placed on a hot plate which was at a temperature of 150° C. Each composition was stroked with a spatula and the time required to reach a "no string" condition noted and reported as the Gel Time. A "no string" condition is reached when there is no pulling of strings of material, by the spatula, from the main body of the composition.

A number of solid, curable epoxy polymers were produced using the diepoxy carboxylate described in Example 1, triethylamine in an amount of 0.5 equivalent (0.5 mole) per carboxyl equivalent methyl isobutyl ketone and the anhydrides and acids listed in Table II. Reaction conditions and recovery of polymer were the same as described in Example 4. Polymers prepared are numbered 19 through 21.

TABLE II

|  | 19 | 20 | 21 |
|---|---|---|---|
| Reactants: | | | |
| Anhydride | Phthalic | Hexahydrophthalic | Hexahydrophthalic |
| moles | 0.225 | 0.180 | 0.200 |
| Diacid | Fumaric | Fumaric | Fumaric |
| moles | 0.125 | 0.180 | 0.140 |
| Epoxide equivalents | 1.30 | 1.08 | 1.08 |
| Product: | | | |
| Epoxide equivalent weight: | | | |
| Calculated | 362 | 380 | 336 |
| Found | 344 | 364 | 325 |
| Ball and ring softening point, °F. | 220 | 198 | 183 |
| Gel time (seconds) | 30 | 47 | 50 |

TABLE I

|  | 10 | 11 | 12 | 13 | 14 | 15 | 16 | 17 | 18 |
|---|---|---|---|---|---|---|---|---|---|
| Reactants: | | | | | | | | | |
| Diacid | Isophthalic | Isophthalic | | | Fumaric | Fumaric | Fumaric | Fumaric | Succinic |
| moles | .069 | .069 | | | .0115 | 0.750 | 0.235 | 0.15 | 0.15 |
| Triacid | TMA | TMA | TMA | TMA | TMA | TMA | Citric | Citric | Citric |
| moles | 0.203 | 0.203 | 0.150 | 0.163 | 0.188 | 0.500 | 0.082 | 0.100 | 0.100 |
| Epoxide equivalents | 1.210 | 1.330 | 1.00 | 1.00 | 1.173 | 6.00 | 1.134 | 1.11 | 1.11 |
| Product: | | | | | | | | | |
| Epoxide equivalent weight: | | | | | | | | | |
| Calculated | 500 | 400 | 302 | 335 | 339 | 340 | 474 | 369 | 369 |
| Found | 505 | 439 | 320 | 344 | 342 | 351 | 510 | 377 | 381 |
| Ball and ring softening point °F | 200 | 188 | 180 | 190 | 199 | 178 | 228 | 193 | 190 |
| Gel time (seconds) | | 29 | | | 11 | | 39 | 42 | 49 |

In Table I:
  TMA=abbreviation for trimellitic acid

Calculated epoxide equivalent weight in Table I and throughout this specification was determined by use of the following equation:

Calculated Epoxide Equivalent Weight
$$= \frac{\text{Theoretical Polymer Yield}}{\text{Equivalents Epoxide} - \text{Equivalents Carboxy}}$$

Actual epoxide equivalent weight found as noted in Table I and throughout this specification was determined by the perchloric acid-tetraethylammonium bromide method.

A number of solid, curable epoxy polymers were produced using the diepoxy carboxylate described in Example 1, triethylamine in an amount of 0.5 equivalent per anhydride group, water and the anhydrides listed in Table III. Reaction conditions and recovery of polymer were the same as described in Example 4. Polymers prepared are numbered 22 through 28.

TABLE III

|  | 22 | 23 | 24 | 25 | 26 | 27 | 28 |
|---|---|---|---|---|---|---|---|
| Reactants: | | | | | | | |
| Anhydride | THPA | MTHPA | Phthalic | Phthalic | HHPA | HHPA | TBPA |
| moles | 0.34 | 0.34 | 0.65 | 0.70 | 0.35 | 0.35 | 0.225 |
| Water, moles | 0.10 | 0.10 | 0.20 | 0.25 | 0.125 | 0.125 | 0.080 |
| Epoxide equivalents | 1.08 | 1.08 | 2.16 | 2.16 | 1.03 | 1.13 | 0.692 |
| Product: | | | | | | | |
| Epoxide equivalent weight: | | | | | | | |
| Calculated | 319 | 363 | 302 | 334 | 391 | 332 | 519 |
| Found | 332 | 332 | 313 | 347 | 394 | 320 | 594 |
| Ball and ring softening point, °F. | 173 | 170 | 181 | 190 | 196 | 183 | 314 |

In Table III:
  TBPA—stands for tetrabromophthalic anhydride.
  THPA—stands for tetrahydrophthalic anhydride.
  MTHPA—stands for methyltetrahydrophthalic anhydride.
  HHPA—stands for hexahydrophthalic anhydride.
  All data was determined as described for polymers of Table II.

Molding compositions, the formulations of which, in parts by weight, are noted in Table IV below, were prepared, molded and subjected to the tests noted.

TABLE IV

|  | A | B | C | D |
|---|---|---|---|---|
| Polymer of Example 4 | 100 | 100 | 100 | 100 |
| Hexahydrophthalic acid anhydride | 24.5 | 49 | 12.1 | 21.6 |
| Benzophenone tetracarboxylic acid dianhydride |  |  | 12.9 | 23.9 |
| Ratio of anhydride groups to epoxy groups | 0.5/1 | 0.9/1 | 0.5/1 | 0.9/1 |
| Uranyl nitrate hexahydrate | 0.09 |  | 0.08 |  |
| Triethylenediamine |  | 2.0 |  | 2.0 |
| Alumina | 124 | 151 | 125 | 147 |
| Cure to hardness of 50 D at 150° C., in minutes |  | 30 | 5 | 5 | 5 |
| Arc Resistance ASTMD 495: |  |  |  |  |
| Sec. to burn | 123 | 125 | 125 | 123 |
| Sec. to fail | 153 | 151 | 152 | 149 |

Seconds to burn is the time at which material being tested oxidizes as an arc is struck across its surface in accordance with the procedure described in the ASTM test.

Seconds to fails is the time at which the material being tested tracks, that is, loses its insulating properties as an arc is struck across its surface in accordance with the procedure described in the ASTM test.

The results of Table IV clearly show that in view of the arc resistance of the polymers of this invention, they are excellently suited for use as electrical insulators. Also, the polymers of this invention can be formed into shaped articles of desired figuration and used to encapsulate integrated circuits, coils and semi-conductors.

The following epoxides, when used in lieu of the diepoxy carboxylate of Example 1, resulted in the formation of solid, curable polymers.

(1) bis(3,4-epoxy-6-methylcyclohexylmethyl)adipate
(2) bis(3,4-epoxycyclohexylmethyl)oxalate It is to be understood that mixtures of diepoxides, co-reactants and/or amines can be used if so desired in formulating the solid, curable polymers of this invention.

What is claimed is:

1. A method of preparing a solid, curable polymer which comprises polymerizing a mixture consisting essentially of a liquid, cycloaliphatic polyepoxide having an average of more than one vicinal epoxy group per molecule, a polyfunctional, acidic co-reactant having a pKa value of less than about 8 and a tertiary amine wherein the polyfunctional, acidic co-reactant is present in an amount of about 0.05 to about 0.9 equivalent per equivalent of said polyepoxide and the tertiary amine is present in an amount of about 0.5 to about 1 mole per equivalent of said polyfunctional, acidic co-reactant, said polyfunctional acidic co-reactant selected from the group consisting of: fumaric acid, succinic acid, citraconic acid, phthalic acid, hexahydrophthalic acid, tetrahydrophthalic acid, alkyl substituted derivatives of said phthalic acids, halogen substituted derivatives of said phthalic acids, tricarballylic acid, citric acid, hemimellitic acid, trimellitic acid, $\Delta^4$-3-carboxy-6-methyltetrahydrophthalic acid and mixtures of said polyfunctional acidic coreactants.

2. A method as defined in claim 1 wherein the polyfunctional, acidic co-reactant is present in an amount of about 0.20 to about 0.80 equivalent per equivalent of said polyepoxide.

3. A method as defined in claim 1 wherein the cycloaliphatic polyepoxide is a bis(epoxycyclohexane).

4. A method as defined in claim 1 wherein the polyfunctional, acidic co-reactant is generated in situ.

5. A method as defined in claim 7 wherein the polyfunctional, acidic co-reactant is generated in situ from water and an anhydride of a polycarboxylic acid.

6. Process as defined in claim 1 wherein the tertiary amine has the formula

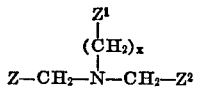

wherein $x$ is an integer having a value of 0 or 1 and Z, $Z^1$ and $Z^2$ are hydrogen or monovalent hydrocarbon radicals having a maximum of 25 carbon atoms.

7. A method as defined in claim 1 wherein the polymerization reaction is conducted at a temperature of about 0° C. to about 250° C.

8. A method as defined in claim 1 wherein the polymerization reaction is conducted at a temperature of about 70° C. to about 130° C.

9. A solid, curable polymer of a mixture consisting essentially of a liquid, cycloaliphatic polyepoxide having an average of more than one vicinal epoxy group per molecule, a polyfunctional, acidic co-reactant, defined in claim 1 having a pKa value of less than about 8 and a tertiary amine wherein the polyfunctional, acidic co-reactant is present in an amount of about 0.05 to about 0.9 equivalent per equivalent of said polyepoxide and the tertiary amine is present in an amount of about 0.5 to about 1 mole per equivalent of said polyfunctional, acidic co-reactant.

10. A solid, curable polymer of a mixture as defined in claim 9 wherein the polyfunctional, acidic co-reactant is present in an amount of about 0.20 to about 0.80 equivalent per equivalent of said polyepoxide.

11. A solid, curable polymer as defined in claim 9 wherein the cycloaliphatic polyepoxide is a bis(epoxycyclohexane).

12. A solid, curable polymer as defined in claim 9 wherein the tertiary amine has the formula

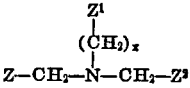

wherein $x$ is an integer having a value of 0 or 1 and Z, $Z^1$ and $Z^2$ are hydrogen or monovalent hydrocarbon radicals having a maximum of 25 carbon atoms.

13. A solid, curable polymer as defined in claim 9 wherein the cycloaliphatic polyepoxide is 3,4-epoxycyclohexylmethyl 3,4-epoxycyclohexane carboxylate.

14. A solid, curable polymer as defined in claim 9 wherein the cycloaliphatic polyepoxide is spiro[3,4-epoxycyclohexane-1,5'-(2'-(3,4-epoxycyclohexyl)-m-dioxane)].

15. A solid, curable polymer as defined in claim 9 wherein the cycloaliphatic polyepoxide has the formula:

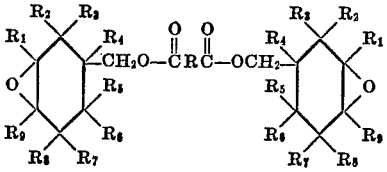

wherein $R_1$ through $R_9$ are hydrogen or alkyl radicals containing 1 to 9 carbon atoms inclusive and R is a valence bond or a divalent hydrocarbon radical containing 1 to 9 carbon atoms.

16. A solid, curable polymer as defined in claim 9 wherein the cycloaliphatic polyepoxide has the formula:

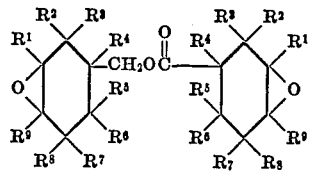

wherein $R^1$ through $R^9$ are hydrogen or alkyl radicals containing 1 to 9 carbon atoms.

17. A solid, curable polymer as defined in claim 9 wherein the polyfunctional acid is fumaric acid.

18. A solid, curable polymer as defined in claim 9 wherein the polyfunctional acid is succinic acid.

19. A solid, curable polymer as defined in claim 9 wherein the polyfunctional acid is trimellitic acid.

20. A solid, curable polymer as defined in claim 9 wherein the polyfunctional acid is phthalic acid.

21. A solid, curable polymer as defined in claim 9 wherein the polyfunctional acid is hexahydrophthalic acid.

22. A solid, curable polymer as defined in claim 9 wherein the polyfunctional acid is tetrahydrophthalic acid.

23. A solid, curable polymer as defined in claim 9 wherein the polyfunctional acid is methyl hexahydrophthalic acid.

24. A solid, curable polymer as defined in claim 9 wherein the polyfunctional acid is citric acid.

25. A solid, curable polymer as defined in claim 9 wherein the polyfunctional acid is tetrabromophthalic acid.

26. A solid, curable polymer as defined in claim 9 wherein the tertiary amine is triethylamine.

27. A solid, curable polymer as defined in claim 9 wherein the tertiary amine is tripropylamine.

28. The cured product of the polymer defined in claim 9.

29. A curable composition comprising the polymer defined in claim 9 and an epoxy curing agent.

30. The cured product of the composition of claim 29.

31. A solid, curable polymer as defined in claim 9 wherein the tertiary amine is N,N-dimethylaniline.

32. A process as defined in claim 1 wherein the tertiary amine is present in an amount of 11 to 50 percent by weight based on the combined weight of said epoxide and said acidic co-reactant.

33. A solid, curable polymer of a mixture as defined in claim 9 wherein the tertiary amine is present in an amount of 11 to 50 percent by weight based on the combined weight of said epoxide and said acid co-reactant.

34. A solid, curable polymer as defined in claim 9 wherein the polyfunctional acid is methyltetrahydrophthalic acid.

References Cited

UNITED STATES PATENTS

| | | | |
|---|---|---|---|
| 3,438,849 | 4/1969 | Isack | 260—47 EP |
| 2,890,195 | 6/1959 | Phillips et al. | 260—2 EP |
| 3,379,653 | 4/1968 | Ernst et al. | 260—2 EP |
| 3,441,522 | 4/1969 | Soldatos et al. | 260—2 EP |
| 2,928,803 | 3/1960 | Belanger et al. | 260—47 EP |
| 3,547,881 | 12/1970 | Mueller et al. | 260—18 EP |

FOREIGN PATENTS

| | | | |
|---|---|---|---|
| 884,033 | 12/1961 | Great Britain | 260—78.4 EP |

WILLIAM SHORT, Primary Examiner

T. E. PERTILLA, Assistant Examiner

U.S. Cl. X.R.

117—128.4, 161 ZB; 161—186; 260—2 EA, 37 EP, 47 EP, 47, 78.3 R, 78.4 EP